June 11, 1957   L. E. CALDWELL ET AL   2,795,241
ROLLED LAMINATED TUBULAR MEMBERS AND METHOD OF MAKING THE SAME
Filed June 15, 1954

WITNESSES:
E. A. McCloskey
Wescott B. Northam

INVENTORS
Lewis E. Caldwell
and Michael Riccitiello.
BY
Frederick Shapoe
ATTORNEY United States Patent Office 2,795,241
Patented June 11, 1957

2,795,241

ROLLED LAMINATED TUBULAR MEMBERS AND METHOD OF MAKING THE SAME

Lewis E. Caldwell, Greensburg, and Michael Riccitiello, Trafford, Pa., assignors to Westinghouse Electric Corporation, East Pittsburgh, Pa., a corporation of Pennsylvania Application June 15, 1954, Serial No. 436,865

8 Claims. (Cl. 138—78)

This invention relates to a rolled laminated tubular member and a method of making the same.

It is a practice to make draw winder bobbins from a laminated tube composed of rolled sheet fibrous material impregnated with a phenolic resin. When employed with some of the recent synthetic fibers, it was found that the high tensions developed therewith during drawing collapsed many of the standard draw winder bobbins to such an extent that they were difficult or impossible to remove from the spinning collets. The sag or deflection in these bobbins was so great that an appreciable permanent set was developed during one pass through the process. Accordingly, a substantial proportion were rendered useless with each use thereof.

An object of this invention is to provide a method of making a rolled laminated tubular member of high strength comprising a sheet fibrous material filler impregnated and bonded together with a phenolic resin comprising a critical ratio of a strong alkali catalyzed phenolic resin and another phenolic resin which is compatible therewith.

A further object of this invention is to provide a rolled laminated tubular member of high strength comprising a sheet fibrous material filler impregnated and bonded together with a phenolic resin comprising a critical ratio of a strong alkali catalyzed phenolic resin and another phenolic resin which is compatible therewith.

Other objects of the invention will, in part, be obvious and will, in part, appear hereinafter.

For a better understanding of the nature and objects of the invention, reference should be had to the following detailed description and drawing, in which.

We have discovered that a rolled laminated tube having a strength higher than heretofore known in tubes of the same construction, can be rolled from a sheet fibrous material impregnated with a specific combination of phenolic resins. This is accomplished by utilizing as an impregnant a novel phenolic resin varnish formulation comprising a critical ratio of from 35% to 65% by weight of a phenol-formaldehyde resin which is catalyzed by a strong alkali selected from the group consisting of sodium hydroxide and potassium hydroxide, or mixtures of both, in an amount of from 0.25% to 5% by weight, based on the weight of the phenol, and from 65% to 35% by weight of another phenol-formaldehyde resin prepared by using from 0.25% to 5% by weight, based on the weight of the phenol of a substantially weaker alkaline catalyst selected from the group consisting of calcium, barium, and strontium oxides and hydroxides, or mixtures of two or more. These two resins are compatible.

Each of the phenol-formaldehyde resins may be prepared by reacting formaldehyde with a phenol selected from the group consisting of phenol, cresol, cresylic acid, xylenols and alkyl-substituted phenols, or mixtures of any two or more. The best results have been secured by using phenol (hydroxybenzene). For each mol of phenol, there is provided from about 1 to 1.5 mols of formaldehyde or a reactive methylene polymer of formaldehyde such, for example, as paraformaldehyde or other trioxymethylenes, or mixtures of two or more.

The reaction is carried out in a conventional reaction vessel provided with condensers, stirrers, and the like, under reflux and subsequent vacuum dehydration until there is produced an A-stage resin solution having a viscosity of from 200 to 350 centipoises, in an organic solvent, of from 40% to 50% resin solids content. The set time for the varnish should be from 11 to 15 minutes.

Any conventional solvent, such as alcohol, benzene, or mixtures of alcohol or other organic solvents, may be used so long as each of the phenol formaldehyde varnishes are compatible or miscible.

Figure 1:
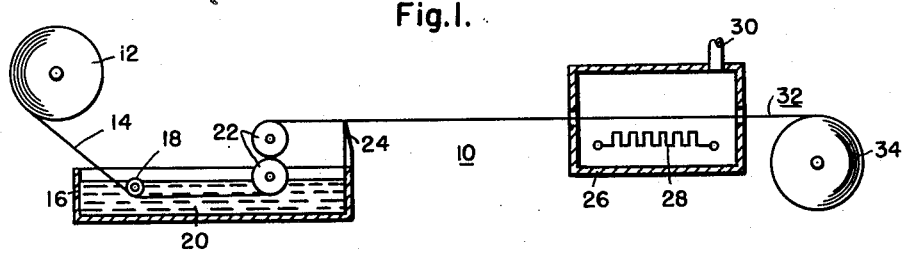
Figure 1 is a view in elevation, partly in section, of apparatus for impregnating sheet material with a resinous varnish.

Referring to Figure 1 of the drawing, there is illustrated apparatus 10 for the treatment of paper with the resinous composition of the present invention. A roll 12 of paper comprising a sheet of paper 14, the paper being either kraft paper or alpha-cellulose paper or an equivalent strong paper, is disposed at one end of the apparatus 10. The sheet of paper 14 is withdrawn from the roll 12 and passes into a varnish dip pan 16 beneath a roller 18 immersed in the phenolic resin varnish mixture 20 comprising from 35% to 65% by weight of the strong alkali catalyzed phenolic resin and from 65% to 35% by weight of the other phenolic resin, so that the paper 14 is soaked in the phenolic varnish mixture. The paper is withdrawn from the varnish mixture 20 and passes between a pair of squeeze rolls 22 where the amount of applied phenolic varnish is controlled by the setting of the rolls. The bottom side of the strip of treated paper is finally drawn over a scraper 24 to remove superficial phenolic varnish from that one side of the paper. The strip of paper with the applied phenolic varnish then passes into an oven 26 having electrical heating elements 28 or other suitable heating means where the solvent from the varnish is evaporated, and the phenolic resins on the sheet are advanced in cure to the B-stage. Solvent vapors escape through the stack 30 of the oven. The product withdrawn from the oven is a sheet 32 of paper carrying B-stage phenolic resin and may be formed into a roll 34 for storage, cut, or otherwise handled.

Figure 2:
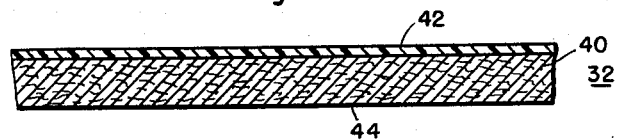
Fig. 2 is an enlarged fragmentary cross-section through a sheet of paper impregnated with a B-stage phenolic resin.

As illustrated in enlarged cross section in Fig. 2, the treated sheet 32 comprises a body 40 completely impregnated with phenolic resin in the B-stage and carrying on its upper surface a thin surface layer 42 of phenolic resin while the bottom surface 44 of the sheet is substantially free from any superficial phenolic resin. There is present on the surface 44, however, a very small amount of resin, it not being practicable to remove all of the resin with the scraper 24.

The sheet 32 is impregnated, after scraping, to a resin ratio of from 2.0 to 2.5. Resin ratio is defined as the weight of the sheet plus the weight of the resin to the weight of the untreated sheet. Therefore, the sheet 32 comprises phenolic resin in an amount of from 100% to 150% of the weight of the sheet alone.

Thereafter, the sheet 32 of paper with the applied B-stage phenolic resin is passed between two rolls 46 and 48 heated to a temperature of from 150° to 170° C. to fuse the B-stage resin just immediately before it is rolled on a mandrel. The tube may have as many plies or turns of the sheet as is desired. The plies will bond to each other through the fused layer 42.

Figure 3:
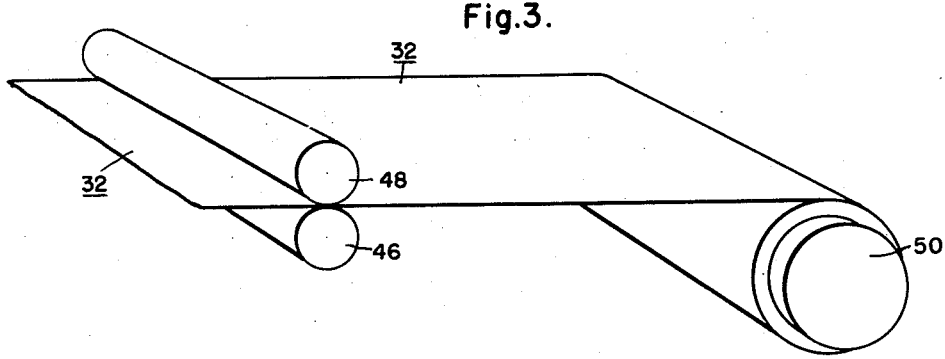
Fig. 3 is a view in perspective of a tubing being rolled.

Referring to Fig. 3 of the drawing, there is illustrated schematically this stage of the process. The sheet of paper 32 is rolled on a steel mandrel 50, preferably a solid mandrel. The surface of the mandrel 50 is initially provided with a coating of a lubricant or another parting medium to enable the ultimately formed tubing to be separated readily therefrom. As illustrated, the sheet 32 is wrapped about the mandrel so that the surface layer of resin 42 on the sheet of paper is inwardly disposed. In rolling the sheet of paper 32 on the mandrel 50, as much tension and pressure should be applied as is possible without tearing the paper. Rollers may be applied about the mandrel 50 to compress the applied plies of paper thereon.

Figure 4:
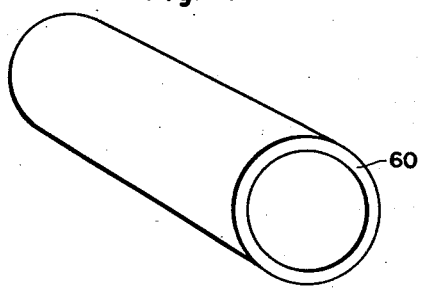
Fig. 4 is a perspective view of a finished tube.

The mandrel with the wrapped sheet 32 applied thereon to a suitable thickness is then put into an oven heated to a temperature of from 140° C. to 160° C., or higher, if desired. In a period of time of from 30 minutes to several hours, depending on the temperature, the thickness of the tubing on the mandrel, and other factors, the B-stage phenolic resin will have first fused and then hardened into a final infusible and insoluble C-stage phenolic resin uniting the paper laminations of the rolled tube into a high-density, bonded structure thoroughly impregnated with the resin. Thereafter, the mandrel may be removed by withdrawing the mandrel through a close fitting collar. Except for sanding or machining to size and desired surface finish, ordinarily there will be little further processing required in order to produce the fully cured, laminated tube 60 as illustrated in Figure 4 of the drawing.

It will be appreciated that collapsible mandrels which are well known in the art may be employed instead of the solid mandrel illustrated.

The following example is illustrative of the invention.

*Example 1*

A resin mixture was prepared by combining varnishes to produce a mixture comprising 50 parts by weight of a phenol-formaldehyde resin catalyzed with sodium hydroxide in an amount of 1% by weight, based on the weight of the phenol, and 50 parts by weight of a phenol-formaldehyde resin catalyzed with calcium hydroxide in an amount of 0.4% by weight based on the weight of the phenol. The resin varnish mixture comprised 41% by weight of resin solids, the balance being volatile solvent, and had a viscosity of 275 centipoises. Kraft paper having a thickness of 0.0035 inch was treated in the resin mixture in a single dip to provide an impregnated paper having a resin ratio of 2.3 and then advanced to the B-stage by drying in an oven. The paper was passed over a hot roll and then rolled on a steel mandrel and cured in an oven at 150° C. for four hours. The resulting laminated tubing had a density of 1.31, a 3 11/16 inch inside diameter and a 4 3/16 inch outside diameter.

The following table shows a comparison of the amount of deflection obtained on sets of three tubes, the tubes A being prepared as above and tubes B being prepared in the same manner but using a phenolic resin which was one of the best previously known tubing resins. The tubes tested were 4 inches long and a hydrostatic force of 1,000 p. s. i. was applied on the full circumference of a 3 inch long section. The deflection shown is maximum in the center of the 3 inch span.

TABLE I

| Tube No. | Radial Deflection in Inches | |
|---|---|---|
| | A | B |
| 1 | .01100 | .021 |
| 2 | .00950 | .0195 |
| 3 | .00925 | .0190 |

It will be noted that the tube of this invention deflects approximately 50% less than the best previously available tubing.

The tubes prepared in accordance with this invention have sufficient rigidity to make draw winder bobbins for use with the newer synthetic fibers requiring higher tensions during drawing. The necessary toughness to withstand the abuse of rough handling which is incidental to spin bobbins has not been sacrificed.

Paper has been used throughout the specification in illustrating the practice of this invention, however, other sheet fibrous materials, such as cotton duck, have been found to give equally good results.

While the present invention has been described with respect to tubes of circular cross section, it should be understood that tubes having other cross sections, such as octagonal, hexagonal, elliptical, or the like, may be produced in a similar manner with equally satisfactory results.

Since certain obvious changes may be made in the above procedure and different embodiments of the invention could be made without departing from the scope thereof, it is intended that all matter contained in the above description shall be interpreted as illustrative and not in a limiting sense.

We claim as our invention:

1. In the method of making a rolled laminated tubular member, the steps comprising impregnating a sheet fibrous material with an A-stage phenolic resin varnish, the varnish comprising 35% to 65% by weight of a phenol-formaldehyde resin which is catalyzed by a strong alkali and from 65% to 35% by weight of a phenol-formaldehyde resin catalyzed with a weak alkali, scraping the varnish from one side of the varnish impregnated sheet, heating the sheet in an oven to evaporate the varnish from the sheet and advance the resin to the B-stage, passing the B-stage resin impregnated sheet over a heated roll to fuse the resin, wrapping a plurality of turns of the heated resin impregnated sheet on a mandrel with the scraped side being outwardly from the mandrel, heating the mandrel with the wrapped sheet thereon to advance the resin to its final infusible insoluble C-stage to bond the sheet together and form a laminated tubular member, and withdrawing the mandrel from the tube.

2. The method of claim 1 in which the sheet fibrous material is kraft paper.

3. The method of claim 1 in which the scraped resin impregnated sheet has a resin ratio of from 2.0 to 2.5.

4. The method of claim 1 in which the varnish comprises 35% to 65% of a phenol-formaldehyde resin which is catalyzed with a strong alkali in an amount of from 0.25% to 5% by weight, based on the weight of the phenol, the strong alkali being selected from at least one of the group consisting of sodium hydroxide and potassium hydroxide, and from 65% to 35% by weight of a phenol-formaldehyde resin which is catalyzed with a weaker alkali in an amount of from 0.25% to 5% by weight, based on the weight of the phenol, the weaker alkali being selected from at least one of the group consisting of calcium, barium, and strontium oxides and hydroxides.

5. The method of claim 1 in which the varnish comprises 35% to 65% by weight of a phenol-formaldehyde which is catalyzed by sodium hydroxide and 65% to 35% by weight of a phenol-formaldehyde resin catalyzed by calcium hydroxide.

6. A rolled laminated tubular structure comprising sheet fibrous material impregnated to a resin ratio of from 2.0 to 2.5 with a phenol-formaldehyde resin, the resin comprising from 35% to 65% by weight of a phenol-formaldehyde resin catalyzed with at least one strong alkali selected from the group consisting of sodium hydroxide and potassium hydroxide in an amount of from 0.25% to 5% by weight, based on the weight of the phenol, and from 65% to 35% by weight of a phenol-formaldehyde resin catalyzed with at least one weaker alkali selected from the group consisting of calcium, barium, and strontium oxides and hydroxides in an amount of from 0.25% to 5% by weight, based on the weight of the phenol.

7. A rolled laminated tube comprising paper sheet impregnated to a resin ratio of from 2.0 to 2.5 with a phenol-formaldehyde resin, the resin comprising from 35% to 65% by weight of a phenol-formaldehyde resin catalyzed by a strong alkali selected from at least one of the group consisting of sodium hydroxide and potassium hydroxide, and from 65% to 35% by weight of a phenol-formaldehyde resin catalyzed with a weaker alkali which is selected from at least one of the group consisting of calcium, barium, and strontium oxides and hydroxides.

8. The rolled laminated tube of claim 7 in which the paper sheet is kraft paper.

References Cited in the file of this patent

UNITED STATES PATENTS

| | | |
|---|---|---|
| 2,001,031 | Landt | May 14, 1935 |
| 2,433,643 | Beech et al. | Dec. 30, 1947 |
| 2,512,797 | Harvout | June 27, 1950 |